United States Patent [19]

Sudyk

[11] 3,912,325
[45] Oct. 14, 1975

[54] TRUCK BED LINER AND DOCK BUMPER COMBINATION
[75] Inventor: John R. Sudyk, Middlefield, Ohio
[73] Assignee: The Johnson Rubber Company, Chagrin Falls, Ohio
[22] Filed: Oct. 31, 1974
[21] Appl. No.: 519,504

[52] U.S. Cl................ 296/39 R; 52/177; 52/506; 52/710; 105/423; 296/28 D
[51] Int. Cl.²........................................ B62D 33/00
[58] Field of Search............ 296/39 R, 39 A, 28 D; 52/506, 511, 512, 710, 479, 177; 105/375, 422, 423, 1 R, 1 A

[56] References Cited
UNITED STATES PATENTS

| | | | |
|---|---|---|---|
| 1,155,243 | 9/1915 | Jordahl | 52/710 |
| 3,578,375 | 5/1971 | Finefrock | 296/39 R |
| 3,662,509 | 5/1972 | Studzinski | 52/479 X |
| 3,687,093 | 8/1972 | Byrd, Jr. | 52/506 X |
| 3,715,846 | 2/1973 | Sullhofer | 52/177 X |

FOREIGN PATENTS OR APPLICATIONS

| | | | |
|---|---|---|---|
| 390,906 | 4/1933 | United Kingdom | 52/479 |

Primary Examiner—Frank E. Werner
Assistant Examiner—Donald W. Underwood
Attorney, Agent, or Firm—McNenny, Farrington, Pearne & Gordon

[57] ABSTRACT

A wear liner for protecting a load surface from impact and wear loads is disclosed. The wear liner includes an elongated body of elastomeric material with a reinforcing and mounting plate embedded therein. A channel is formed in the mounting side of the liner member to receive a mounting bar secured to the load surface. Spaced fasteners secure the reinforcing plate directly to the mounting bar and in turn secure the liner member in its mounted position. The reinforcing plate is provided with interlocking sections on both sides of the channel to firmly secure the elastomeric material to the reinforcing plate. Removable plugs formed of elastomeric material are installed in the openings for the mounting fasteners. The reinforcing plate is spaced from the load surface by a distance in excess of one-half of the thickness of the liner member and extends across the width of the liner member a distance greater than one-half of the width thereof.

6 Claims, 4 Drawing Figures

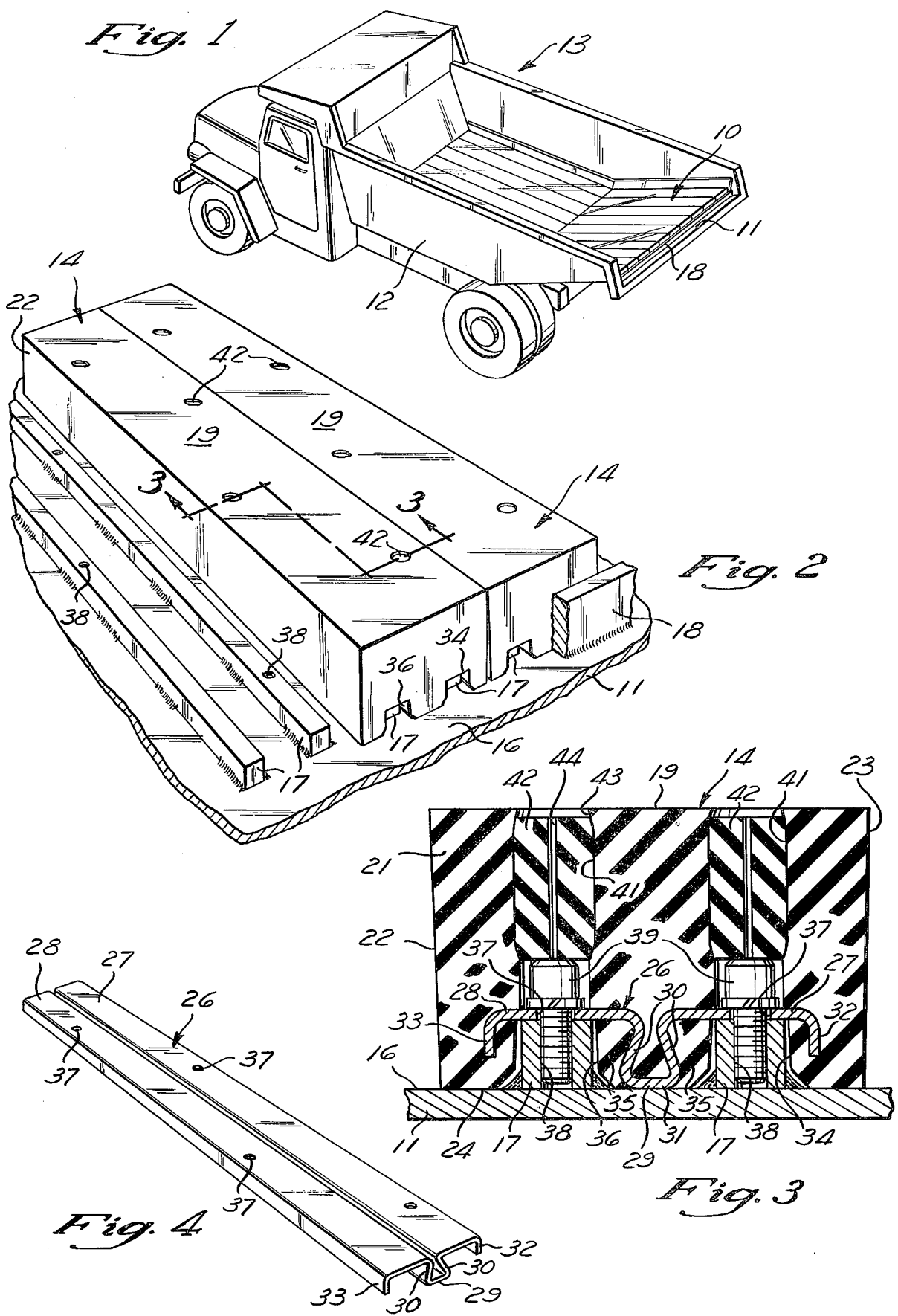

TRUCK BED LINER AND DOCK BUMPER COMBINATION

BACKGROUND OF THE INVENTION

This invention relates generally to wear liners or the like and more particularly to a novel and improved wear structure for surfaces which must withstand high wear loads.

PRIOR ART

Wear liners and bumpers for protecting a surface from wear loading including high impact loads or abrasive loads are known. For example, the U.S. Pat. No. 3,578,375 dated May 11, 1971, illustrates a liner structure for large trucks used in earth moving operations. The bodies of such trucks must, in many instances, absorb tremendous impact loads ocurring when large and often jagged pieces of rock are dropped onto the truck from a loader. Further, the U.S. Pat. No. 3,225,731 dated Dec. 28, 1965, and U.S. Pat. No. 3,447,794 dated June 3, 1969, disclose fender and bumper structures to protect against abrasion and impacts under heavy loading conditions. All of these patents are assigned to the assignee of the present invention.

SUMMARY OF THE INVENTION

The present invention provides a novel and improved abrasion and impact absorbing structure which may be used in a variety of different applications. For example, the structure may be applied to truck or vehicle bodies to protect against the impacts which occur when large and jagged rocks are dropped into the body and to protect against the wear which occurs when loads of such rocks are hauled from place to place.

The preferred structure may also be used on docks to protect against damage and wear when trucks or ships engage such docks. The structure may also be used as a fender on land and marine vehicles. For example, it may be used on boats which push trains of barges or the like.

In accordance with one preferred embodiment of this invention, a mounting bar is welded to a support surface. An elongated wear member is secured to the mounting bar. The wear member includes an elongated body of tough, elastomeric material having a mounting and reinforcing plate embedded therein. The member is formed with a lengthwise channel adapted to fit over and mate with the bar with the reinforcing plate engaging the surface of the bar. A plurality of lengthwise space fasteners extend through the reinforcing and mounting plate into the mounting bar to secure them together.

The preferred reinforcing plate is provided with lateral skirt portions on both sides of the channel to interlock the reinforcing plate and the elastomeric material on both sides of the mounting channel. The openings through which the fasteners are installed or removed are closed by plugs also formed of elastomeric material which are forced into the access openings with an interference fit. The plugs are formed with central openings which serve as vents to allow the escape of air when the plugs are inserted and which allow for removal of the plugs by threading a lag screw or the like into the openings so that the plugs may be pulled by the screw out of their installed position.

In the illustrated embodiment, each wear member is formed with two parallel channels, each of which fits over an associated mounting bar. The fasteners for securing the mounting plate to the two associated mounting bars are staggered along the length of the wear member. The wear members are illustrated as mounted on a truck body in abutting relationship so that they provide a wear surface completely covering such truck body.

BRIEF DESCRIPTION OF THE DRAWINGS

FIG. 1 is a perspective view of a typical dump truck with a wear liner in accordance with this invention installed thereon;

FIG. 2 is an enlarged fragmentary perspective view with parts removed for purposes of illustration of the liner illustrated in FIG. 1;

FIG. 3 is a broken section take along 3—3 of FIG. 2 illustrating the preferred structure of the liner member and its reinforcing plate; and, FIG. 4 is a fragmentary perspective view of the reinforcing plate illustrated in FIG. 3.

DETAILED DESCRIPTION OF THE DRAWINGS

Referring to FIG. 1, a wear and cushioning liner assembly 10 is illustrated installed along the floor or bottom wall 11 of the load body 12 of a dump-type truck 13. In such a vehicle, it is common practice to drop the load onto the load body 12 from a loader. Therefore, the principal impact load on the load body occurs along the bottom wall 11. For this reason, the side walls of the vehicle are normally not provided with cushioning liner assemblies, however, if the side walls are subjected in use to substantial impact and wear loads, they may be provided with liner structures in accordance with the present invention.

Referring to FIGS. 2 through 4, the liner assembly includes a plurality of separate liner members 14 which, in the illustrated embodiment, are positioned in abutting relationship so as to completely cover the support surface 16 provided by the bottom wall 11. In some instances, the liner members may be spaced from each other so long as they provide sufficient coverage of the support surface to adequately protect such surface.

A pair of mounting bars, which are preferably rectangular in cross section, are welded or otherwise suitably fastened to the support surface 16 for each of the liner members. In FIG. 3, two of the mounting bars 17 are illustrated without an associated liner member. The ends of the other mounting bar 17 are visible under the liner members 14. An end plate 18 is preferably secured to the support surface at the end of the liner member to assist in supporting and protecting such ends. The end plate 18 is preferably sized so that its upper surface is spaced below the upper surface 19 of the liner member.

Each of the liner members 14 includes an elongated body of tough, elastomeric material 21, which is generally rectangular in cross section. The body 21 provides the upper surface 19, two side surfaces 22 and 23, and a bottom surface 24. In an installation such as illustrated in FIG. 1, the upper surface 19 is the only exposed surface of the liner member and it is this surface that must absorb the various loads applied to the liner assembly. The side surfaces 22 and 23 abut the side surfaces of adjacent liner members. Preferably, the two side surfaces 22 and 23 converge inwardly in the downward direction so as to provide a slight spacing between the adjacent side surfaces, excepting along the upper surface 19. This inclination of the side surfaces provides a zone between adjacent liner members which can accommodate some deflection of the elastomeric body. Also, the inclination of the side surfaces provides a draft which assists in allowing the removal of the liner member from the mold in which it is formed.

The material used to form the elastomeric body should be selected to provide the properties of resistance to wear, tensile strength, surface hardness and resistance to aging and heat. Materials meeting the ASTM and SAE standards, SAE-J-200, 2AA-635B-13, C12 and F17, tend to provide these desired properties. Preferably the durometer is in the range of 60 plus or minus five.

Referring to FIGS. 3 and 4, a reinforcing plate 26 is embedded in the body of elastomeric material 21 during the molding process of manufacture. The plate includes two generally horizontal portions 27 and 28, which are joined at their inner edges by a dovetail-type interlocking section 29. This section includes diverging walls 30 and an end wall 31. Along the outer edges of each horizontal portion 27 and 28, the reinforcing plate is formed with a depending skirt portion 32 and 33. The plate 26 is preferably formed of a relatively high strength metal having a sufficient thickness to provide the mounting strength and to reinforce the liner member.

Lengthwise channels 34 and 36 are formed in the elastomeric body to fit over and mate with the associated mounting bars 17. In practice, the size of the channels 34 and 36 is proportioned so that they loosely receive the associated mounting bar so that they can accommodate some positional tolerance of the bars. They are also chambered at the edges of the channel to accommodate the weld between the mounting bars and the support surfaces 16. The portions 35 of elastomeric material below the reinforcing plate 26 on either side of the interlocking section 29 are separated by the reinforcing plate 26, from the main body of elastomeric material but serves to support the plate between the channels.

Spaced lengthwise along the mounting bars and the reinforcing plate are openings 37 which are in alignment with threaded openings 38 in the mounting bars 17. The mounting plate 26, and in turn the elastomeric body 21, is firmly secured to the associated mounting bars by socket head screw fasteners 39 which extend through the openings 37 and are threaded into the mounting bars. FIG. 3 is a staggered section as illustrated in FIG. 2 and the screw fasteners are spaced along the associated mounting bars and are not positioned side-by-side, as would appear from the section in FIG. 3. Instead, the fasteners, which are threaded into the left-hand mounting bar, are located approximately halfway between the fasteners that are threaded into the right-hand mounting bar.

The elastomeric body 21 is formed with openings 41, aligned with each of the openings 37 in the reinforcing plate 26. These openings 41 provide access to permit the installation and removal of the fasteners 39. After the fasteners 39 are installed, plugs 42 are driven into each of the openings 41, as best illustrated in FIG. 3. These plugs 42 are preferably formed of elastomeric material of the same composition as the elastomeric material of the body 21. They are sized with an interference fit so that they are permanently mounted by merely driving them into the openings 41. Preferably, the length of the plugs 42 is slightly less than the distance between the top of the heads of the fasteners 39 and the upper or wear surface 19, so that the elastomeric material extends in over the tops of the plugs as illustrated in 43, to assist in securing such plugs in their mounted position. The plugs 42 are preferably formed with small central openings 44, which act as vents to allow escape of air as the plugs are installed, and which also are used to receive a threaded screw-like member, such as a lag screw, when removal of the plugs is desired.

In the event that it becomes necessary to remove and replace a worn or damaged liner member 14, it is merely necessary to thread a lag screw-type fastener into the opening 44 in the plugs and then apply tension to the fastener to pull the plugs out of the openings 31. Access is then provided to the fasteners which can be easily removed to allow replacement.

In most installations, and in particular in the installation as illustrated in FIGS. 1 and 2, the principal load absorbing surface is the surface 19. Therefore, it is desirable to provide a substantial spacing between the surface 19 and the reinforcing plate 26 so that the action of deflection of the elastomeric body 21 will function to distribute to the load forces applied over sufficient area to prevent damaging localized stresses, either to the reinforcing plate 26, or the bond between such plate and the elastomeric material.

The reinforcing plate should be spaced from the surface 19 by more than one-half the thickness of the liner. In the illustrated embodiment, such spacing is more than two-thirds the thickness. Further, it is desirable to form the skirts 32 and 33 so that they are inwardly spaced from the side walls of the elastomeric body. However, the reinforcing plate 26 should be sufficiently wide to extend across a distance well in excess of one-half of the width of the liner members. In the preferred structure illustrated, the dovetail section 29 interlocks with the elastomeric material 21 along the zone between the two support bars 17 and the skirts 32 and 33 interlock with the opposite sides. This structure provides a high degree of strength in the combined assembly wherein the reinforcing plates greatly increase the strength of the assembled device. Further, the use of two mounting bars 17 improves the strength of the mounting by supporting the reinforcing member at spaced locations. In the illustrated embodiment, the lower surface of the reinforcing plate is actually in engagement with the upper surface of the mounting bars for maximum support. Further, the dovetail section 29 is proportioned so that its lower wall 31 rests against the support surface 16 to provide additional support.

The reinforcing plates are sized to be slightly shorter than the liner members so that their ends are spaced inwardly from the ends of the liner members a short distance. For example, in a liner member which is four feet long, it is preferable to form the reinforcing plate about 47½ inches long so that its ends are spaced inwardly from the ends of the reinforcing plate about a quarter of an inch. Similarly, the mounting bars may be sized so that their ends are spaced back from the end of the liner members by a distance, for example, of one-half inch.

In one particular embodiment of the illustrated invention, the mounting bars are about 1 inch and a quarter wide and high. The liner members are about 8 inches wide and about 5 inches thick. In such embodiment the reinforcing plate is about 6 inches wide and about 5/32 of an inch thick. The length of the liner members is arranged to provide good coverage of the truck body. However, if necessary, separate liner members may be abutted at their ends to provide their necessary lengths of the assembled system.

Although the present invention is illustrated only as applied to the truck body, it is also applicable in other installations, as discussed above where a high degree of impact and wear resistance is desired. Because of the relatively thick section, and in particular the relatively thick section between the principal wear face and the reinforcing member, extremely large loads can be absorbed without damaging the liner member.

Although a preferred embodiment of this invention is illustrated, it is to be understood that various modifications and rearrangements may be resorted to without departing from the scope of the invention disclosed and claimed.

What is claimed is:

1. A liner structure comprising a support surface, a plurality of substantially parallel and spaced mounting bars secured to said surface, a plurality of elongated liner members secured to said mounting bars, each liner member including an elongated body of tough elastomeric material and an elongated mounting plate embedded in and bonded to said elastomeric material, said body being formed with a lengthwise channel fitting over and mating with an associated bar, and a plurality of fasteners spaced along said body securing said plate to the associated bar and securing said liner member to said surface, said plate being provided with depending skirt portions on either side of said channel interlocking said plate and said elastomeric material on both sides of said channel.

2. A liner structure as set forth in claim 1 wherein said elastomeric material is formed with access openings through which said fasteners are installed and removed, and plugs of elastomeric material fill said openings.

3. A liner structure as set forth in claim 2 wherein said plugs fit into said openings with an interference fit, said plugs being provided with a central passage therein.

4. A liner structure as set forth in claim 1 wherein each liner member is formed with at least two substantially parallel channels each fitting over and mating with an associated bar, and said plate and elastomeric material being formed with interlocking means between said channels.

5. A liner structure as set forth in claim 4 wherein said plate is fully supported by said bars, said support surface and said elastomeric material.

6. A liner structure as set forth in claim 1 wherein said support surface is a vehicle load supporting surface.

* * * * *